Nov. 6, 1956 T. A. RICH 2,769,337
REBALANCE TYPE FLOW METER
Filed Nov. 12, 1952 2 Sheets-Sheet 1

Inventor:
Theodore A. Rich,
by Paul A. Frank
His Attorney.

Nov. 6, 1956 T. A. RICH 2,769,337
REBALANCE TYPE FLOW METER
Filed Nov. 12, 1952 2 Sheets-Sheet 2

Inventor:
Theodore A. Rich.
by Paul A. Frank
His Attorney.

2,769,337

REBALANCE TYPE FLOW METER

Theodore A. Rich, Schenectady, N. Y., assignor to General Electric Company, a corporation of New York Application November 12, 1952, Serial No. 320,059

7 Claims. (Cl. 73—206)

The present invention relates to a fluid flow meter. More particularly, the invention relates to a flow meter for use in determining either, or both, the rate of flow, and the volume of flow of highly corrosive fluids which are relatively poor conductors of electricity.

In working with fluids of the above-mentioned type, it is quite often desirable to obtain some idea of the flow rate and/or the total flow of the fluid. In the past such information has not been easily or safely obtainable because the corrosive and dangerous nature of the fluid required that the possibility of leakage or escape of the fluid be avoided at all cost. Consequently, it is imperative that meters for use with fluids of this type be designed so that no fittings are needed with lead into the conduit, or which would necessitate breakage of the conduit, thereby affecting its integrity. With conventional flow meters, these conditions could not be met.

It is, therefore, a primary object of the present invention to provide a fluid flow meter for use with highly corrosive fluids, which can be fitted on conduits carrying such fluids without requiring breakage of the conduit walls.

Another object of the invention is to provide a fluid flow meter for use with highly corrosive fluids which is constructed in such a manner that failure of the meter, by reason of the corrosive action of the fluid, is avoided.

A further object of the invention is to provide a fluid flow meter of the above type which is capable of measuring either or both the rate of flow, or the volume of flow of the fluid.

A feature of the invention, is the provision of a meter for measuring the flow of highly corrosive fluids through a section of conduit that is constructed of a non-magnetic material. The meter includes a movably supported element of magnetizable material positioned in the aforementioned section of conduit, and adapted to be displaced in a manner proportional to the flow of fluid through the conduit. Cooperating with this structure is a means for developing a force to compensate for the effect of the displacing force applied to the magnetizable element by reason of the fluid flow, and connected to this last mentioned means is an indicator for deriving an indication of the compensating force whereby a measure of the flow of fluid through said conduit is obtained.

Other objects, features, and many of the attendant advantages of this invention will be appreciated more readily as the same becomes understood by reference to the following detailed description, when considered in connection with the accompanying drawings, wherein the same reference character is applied to similar parts in each of the several figures, and wherein.

Figure 1:
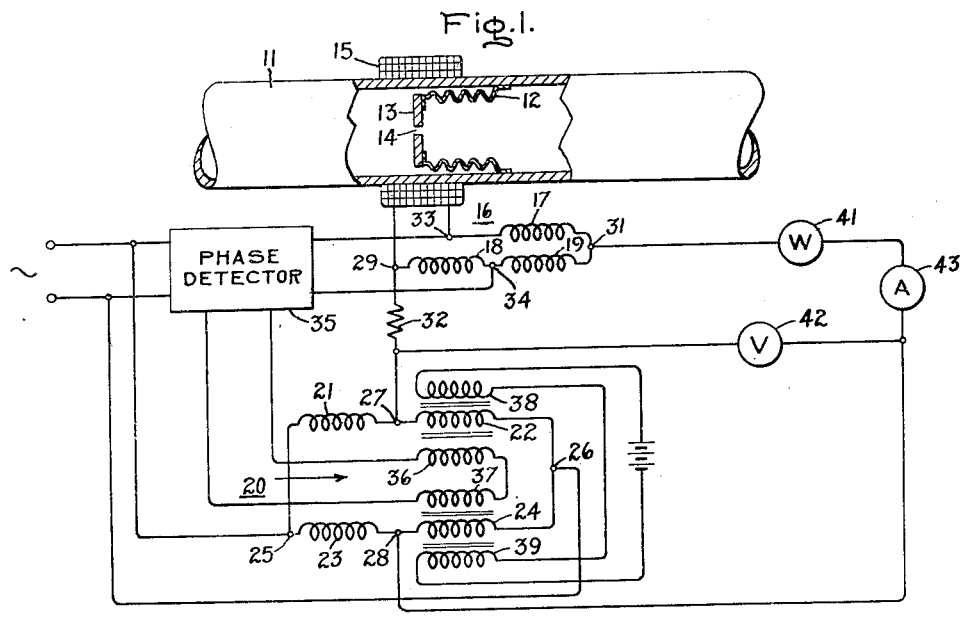
Fig. 1 is a schematic diagram of one embodiment of the invention which shows the various components of the meter comprising the invention, and their relationship with a conduit adapted to carry highly corrosive fluids.

Referring now to the species of the invention illustrated in Fig. 1 of the drawings, a section of conduit 11 is shown, through which the fluid whose flow is to be measured, passes. The fluids passing through conduit 11 may have the special characteristics of being highly corrosive and poor conductors of electricity; however, it should be understood that while the meter comprising the present invention was designed primarily for use with such fluids, it is by no means restricted in its use to fluids of this nature, but may be used to determine the flow of almost all types of fluids. Because of the use for which the meter is primarily intended, however, it is essential that the conduit 11 be constructed of a non-magnetic material; consequently, if the conduit through which the flow to be measured is not ordinarily constructed of non-magnetic material, it is necessary that an elemental link or section of conduit constructed of such material be interposed in the flow line.

Disposed in the section of conduit 11 is a means having a movable portion displaceable in a manner proportional to the flow of fluid through the conduit. This means preferably comprises a flexible bellows 12 having one of the ends thereof secured to the inner wall of conduit 11 in a manner such that a fluid tight connection is achieved which, along with bellows 12, is impervious to the corrosive action of the fluid passing through the conduit. The remaining or movable end of the bellows 12 has an element or plate 13 secured thereto which is constructed of a magnetizable material, and which has an orifice 14 therein that is aligned over a similar opening in the movable end of bellows 12 in flow constricting relation.

In operation, any flow which takes place through the section of conduit 11, must pass through the orifice 14, and, as is well known in classical physics, results in the creation of a pressure differential across the orifice which is a function of the square of the rate of flow of the fluid. Consequently the amount of movement or displacement imparted to plate 13 by reason of the fluid flow, is likewise a function of the square of the flow. Therefore, in order to obtain an indication of the flow occurring through the conduit, all that is required is that some means is provided for determining the location of the magnetizable element or plate 13 relative to a zero flow position.

In the embodiment of the invention shown in Fig. 1, the means provided for determining the location of the magnetizable plate 13 relative to its zero flow position includes a means for applying a magnetic force to the plate 13 counter to the displacing force applied thereto by reason of the fluid flow which comprises a coil 15 wound about the conduit 11 in a manner such that the flux produced by current flow therethrough, passes through the magnetizable element or plate 13. By reason of the above-described construction, the magnetizable plate 13 and coil winding 15 form an elementary electric motor in which the magnetizable plate 13 constitutes the moving armature of the motor, and the force acting on plate 13 is a function of the square of the current flowing through coil 15. Since the force tending to displace plate 13 in one direction due to fluid flow is a function of the square of the flow, and the magnetic force acting on plate 13 to displace the same in a direction opposite to that produced by the fluid flow is a function of the square of the current in coil 15, the current through coil 15 is directly proportional to the flow of fluid through the conduit, and, by measuring the current through coil 15, then, a direct indication of the fluid flow can be obtained.

In order to measure the current flowing in the coil 15, and thereby obtain an indication of the fluid flow in conduit 11, a measuring means is provided which develops a measurable current that is applied through coil 15 to develop a force for counteracting the effect of displacement of magnetizable element 13 relative to coil 15. This measuring means includes circuit means comprising a first bridge network 16 composed of coil 15, and a plurality of inductances 17, 18 and 19 serially connected in a closed electrical loop. Bridge circuit 16 is operatively coupled to a source of alternating current through a second bridge network 20 comprising a plurality of inductances 21, 22, 23 and 24. Bridge 20 has a pair of opposite terminals 25 and 26 coupled across the source of alternating current and a remaining pair of terminals 27 and 28 coupled across a pair of terminals 29 and 31 of first bridge 16 through a resistor 32. A second pair of terminals 33 and 34 of first bridge 16, are connected to an input of a phase detector device 35 which also has a signal from the source of alternating current supplied thereto, and serves to derive an error signal proportional to the unbalance of the bridge circuit 16 produced by movement of the plate 13. A suitable phase detector is shown on page 41 of Ultra-High Frequency Radio Engineering by W. L. Emery, published by the MacMillan Company in 1944. The output of the phase detector device 35 is connected to a pair of inductances 36 and 37 which are physically disposed adjacent the inductances 22 and 24, respectively, and a pair of additional windings 38 and 39 likewise positioned adjacent inductances 22 and 36, respectively, to form saturable reactors whose value may be adjusted by varying the current supplied to additional windings 38 and 39.

In operation, the first bridge 16 comprising reactors 15, 17, 18, 19 is balanced for a no-flow condition through the conduit 11. The bridge 20 is substantially balanced at no-flow condition. That is, at no flow the bridge 20 is in a condition so that a very small voltage exists across the terminals 27, 28 which provides energization for the bridge 16. However, since at this state the bridge 16 is balanced, no output signal is obtained therefrom and from the phase detector 35. Thereafter, upon the occurrence of fluid flow through conduit 11, the plate 13 is displaced by an amount proportional to the rate of flow in the manner previously described. Displacement of the plate 13 from its zero flow position changes the reactance of coil 15, and thereby unbalances the bridge circuit 16 to produce an error signal across terminal 33 and 34 which is applied to the input of phase detector 35. This error signal, which is proportional to the amount of displacement of plate 13, is detected in phase detector 35, and the resulting output signal applied to the inductances 36 and 37 of each of the variable reactors 22, 36, 38 and 24, 37, 39 in bridge network 20. This causes the bridge 20 to become unbalanced, and to pump more current through the coil 15. The increased current flow through coil 15 then produces more magnetic lines of force which tend to restore plate 13 to its original position, and to rebalance bridge 16. The sensitivity of the phase detector is high enough to require only a relatively small displacement of plate 13 between no-flow and full-flow position. When so arranged, the force on the plate 13 due to deflection of bellows 12 is negligible and therefore the magnetic forces are at all times exactly equal to the flow forces.

In order to obtain an indication of the current required to maintain bridge 16 in the balanced condition, a voltmeter 42 is used. Alternatively an ammeter 43 could be substituted. To read integrated flow, say, in gallons per minute a watthourmeter 41 could be connected with its current coil in series circuit relationship with the current supply to bridge 16, and its potential coil energized from the same A. C. supply. In view of the mutual square law relationship between the flow of fluid in conduit 11, and the current flow through coil 15 required to maintain plate 13 in its no-flow position, the watthourmeter 41 can be used to integrate the values of the flow rate over predetermined periods of time, and produces a reading that is linearly proportional to the volume flow of fluid in conduit 11 over the period measured.

For the same reason, the voltmeter 42 produces a reading which is linearly proportional to the instantaneous rate of flow of fluid in conduit 11.

From the foregoing description, it can be readily appreciated that the invention provides a fluid flow meter that can be used to measure the flow of highly corrosive fluids through a section of conduit without requiring that the conduit be broken in order to be secured thereto. The bellows 12 and plate 13 may be mounted inside the conduit with the coil 15 outside and no interconnections between the two is required. Consequently, the integrity of the conduit is in no way affected by mounting the meter thereon. The meter has no relatively movable parts which can become gummed up or clogged due to the corrosive action of the fluid, and, further, it is capable of producing a reliable indication of both the rate of flow, and the total flow of fluids through the conduit.

Figure 2:
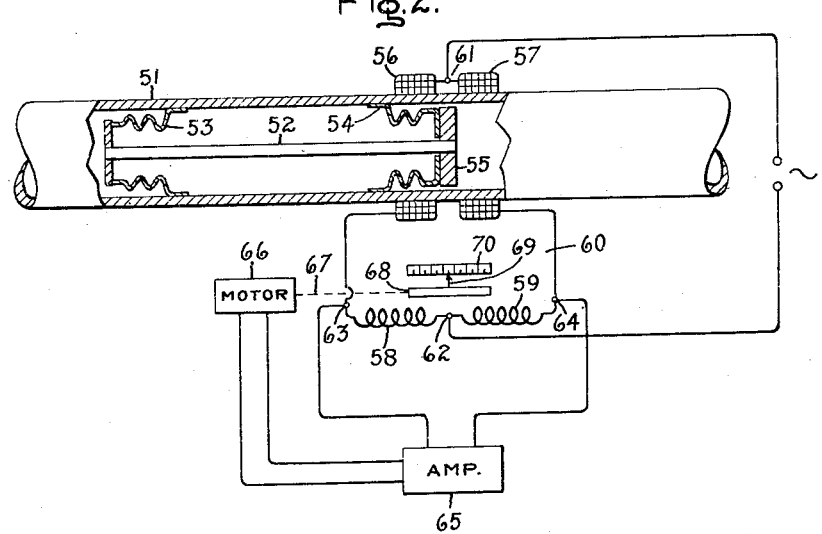
Fig. 2 is a schematic diagram of a second embodiment of the invention which shows the components of the particular meter illustrated, and their relationship to a corrosive fluid carrying conduit.

With reference now to Fig. 2 of the drawings, a second embodiment of a fluid flow meter is disclosed. The flow meter illustrated in Fig. 2 of the drawings is likewise intended for use with highly corrosive fluids which are relatively poor electrical conductors, but may be used to measure the flow of any fluid which is not highly conducting or highly magnetic. The meter is designed to be used in conjunction with a section of conduit 51 constructed of a non-magnetic material that may comprise an integral part of a system of conduits carrying the fluid to be metered, or, alternatively, it may be interposed therein as a part of the meter comprising the invention. Disposed in a section of conduit 51 is a means having a movable portion displaceable in a manner proportional to the flow of fluid through the conduit. This means comprises a capillary tube 52 which is resiliently supported within conduit 51 by means of a supporting structure comprising a pair of opposed flexible bellows 53 and 54 having a respective end of tube 52 secured thereto. The adjacent ends of the bellows 53 and 54 secured to the inner surface of conduit 51 in a manner such that a fluid tight connection is obtained, which is impervious to the action of the corrosive fluid passing through conduit 51. The remaining free, or movable ends of bellows 53 and 54 support the capillary tube 52 so that the longitudinal axis of the tube is coincident with, or parallel to the axis of the conduit 51, and in a manner such that the only flow occurring through the conduit 51 must take place through capillary tube 52. By proper design of the capillary tube, the flow through the tube will produce a differential pressure between the ends thereof which is linearly proportional to the flow of fluid through the conduit. Consequently, flow through capillary tube 52 results in the production of a force acting against the supporting structure which is linearly proportional to the flow of fluid in conduit 51, and which effects a displacement of the structure that is likewise linearly proportional to the flow of fluid. The restraint in this case is due to the spring properties of 53, 54. By measuring the displacement of the bellows structure then, an indication of the fluid flow may be obtained.

In order to determine the movement or displacement of the supporting structure, a magnetizable element or plate 55 is secured to bellows 54, for example. Cooperating with the magnetizable plate 55 are a pair of coil structures 56 and 57 wound about conduit 51 in a manner such that their reactance is oppositely affected by a movement of the magnetic slug 55 due to the displacing force applied thereto by reason of the flow of fluid through conduit 51. A means of detecting the position of plate 55 is provided which comprises a pair of inductances 58 and 59 serially connected in a closed electrical loop with coils 56 and 57 to form a bridge network indicated by the reference numeral 60. The bridge network 60 has a first pair of terminals 61 and 62 connected across a source of alternating current, and a second pair of terminals 63 and 64 connected to the input of an amplifier 65. Amplifier 65 has its output connected to the field winding of a motor 66 that is mechanically connected through linkage, indicated by dotted lines 67, to a core structure 68 associated with each of the inductances 58 and 59. The core structure 68 is axially movable relative to coils 56 and 57, and serves to vary the reactance thereof to compensate for variations of the reactance of coils 56 and 57 due to movement of magnetizable plate 55. In operation, bridge 60 is balanced for a no flow condition, at which point indicating hand 69 is designed to read zero on calibrated scale 71. Upon the occurrence of flow through conduit 51, the pressure differential appearing across capillary tube 52 produces a deflection or displacement of magnetizable element 55 in a manner proportional to the flow of fluid through conduit 51. Movement of magnetizable plate 55 then causes a change of the reactance of coils 56 and 57 and unbalances bridge 60 so as to produce an error voltage between the terminals 63 and 64. The error voltage appearing across terminals 63 and 64 is applied to the input of amplifier 65 where it is amplified and fed to motor 66 to cause the same to move core structure 68 in a direction and amount sufficient to rebalance bridge 60.

Because the amount of movement of core structure 68 necessary to rebalance bridge 60 is directed proportional to the movement of magnetizable element 55, and the movement of magnetizable element 55 is linearly proportional to the flow of fluid through conduit 51, the movement of core structure 68 is likewise linearly proportional to the flow of fluid through conduit 51. Consequently, the flow rate through conduit 51 may be obtained by the provision of an indicator means which includes an indicator arm 69 fixed to core structure 68, and adapted to move therewith over a scale 70 that is linearly calibrated in units of flow.

Figure 3:
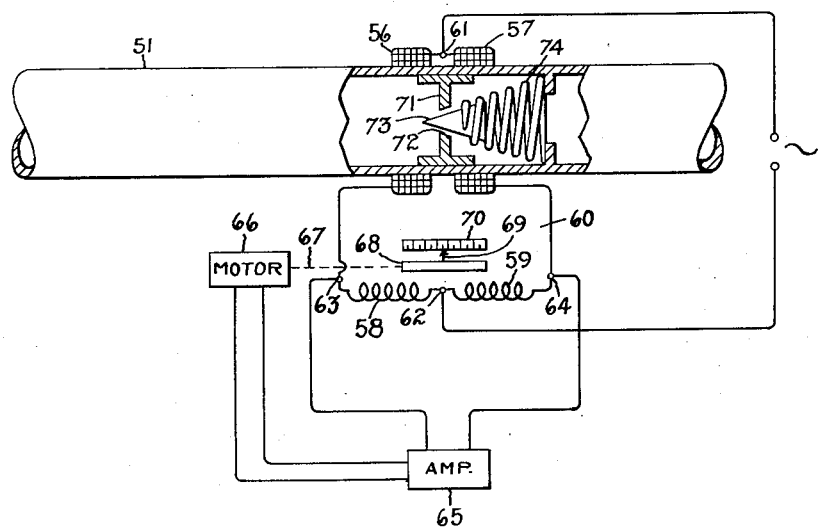
Fig. 3 is a schematic diagram of still another flow meter embodying the novel features of the present invention.

Adverting next to Fig. 3 of the drawings, a fluid flow meter is illustrated which is in many respects similar to the meter shown in Fig. 2, but differs therefrom in the construction of the means for producing a movement of a magnetic element in a manner proportional to the flow of fluid through a conduit. In the embodiment of the invention shown in Fig. 3, the conduit 51 corresponds to the section of the conduit 51 of the meter shown in Fig. 2, and, like its counterpart, it is constructed of a non-magnetizable material. Conduit 51 may comprise an integral part of a system of piping, or, alternatively, may be an elemental length of conduit which comprises a part of the meter described hereinafter. Disposed within section of conduit 51 is a barrier 71 preferably constructed of a non-magnetizable material, that is impervious to the corrosive action of the fluid flowing through the conduit, and positioned in conduit 51 in flow constricting relation. Barrier 71 has an orifice 72 passing therethrough which is adapted to receive a magnetizable element or pintle 73 that is movable along a line parallel to the axis of conduit 51, and supported within the conduit by means of a coil compression spring 74. Coil compression spring 74 is constructed of a material which is not subject to attack by the corrosive fluid in conduit 51, and has the end thereof opposite from magnetizable pintle 73 secured to the inner surface of the conduit.

In operation, the coil compression spring 74 serves to maintain magnetizable pintle 73 closed over orifice 72 in barrier 71 when there is no flow occurring through conduit 51. Upon the occurrence of conditions tending to bring about a flow of fluid through conduit 51, a pressure is built up on one side of pintle 73 which causes the same to be displaced against the action of compression spring 74. Displacement of the pintle 73 allows a flow of fluid to occur through orifice 72 and conduit 51 which, by properly designing the coacting surfaces of pintle 73, and the sides of barrier 71 defining orifice 72, can be made to be linearly proportional to the movement of pintle 73. In order to obtain an indication of flow through conduit 51 then, all that is required is the provision of some means for determining the displacement of pintle 73. Should it be desired to obtain an output following some other function of the flow the shape of the pintle would be so selected.

In the embodiment of the invention shown in Fig. 3 the means for determining the displacement of pintle 73 comprises a measuring circuit which is identical in construction to the measuring circuit described with relation to the embodiment of the meter shown in Fig. 2 of the drawings. Consequently, in Fig. 3, the components of the measuring circuit are given the same reference numeral as the corresponding components of the measuring circuit shown in Fig. 2, and, in view of the fact that the operation of the two measuring circuits is the same, a further description of the operation thereof with relation to the meter shown in Fig. 3, is believed unnecessary.

From the foregoing description it can be readily appreciated that a fluid flow meter is provided for use with highly corrosive fluids which are relatively poor conductors of electricity. A meter constructed in accordance with the invention can be fitted on conduits carrying such fluids without requiring that the walls of the conduit be broken, or the integrity thereof affected, and is designed in a manner such that gumming or clogging of relatively movable parts is avoided. The invention further provides a fluid flow meter for use with highly corrosive fluids, which is capable of measuring either or both the rate of flow, and/or the volume of flow, of such fluids.

Obviously other modifications in the present invention are possible in the light of the above teachings. It is therefore to be understood that changes may be made herein which are within the full intended scope of the invention and defined by the appended claims.

What I claim as new and desire to secure by Letters Patent of the United States is:

1. A meter for measuring the flow of highly corrosive electrically non-conductive fluids through a section of conduit constructed of a non-magnetic material, said meter including a flexible bellows having one of the ends thereof secured to the inner surface of said section of conduit, a magnetizable plate having an orifice therein secured to the remaining free end of said bellows, said bellows and said orificed plate being disposed in said conduit in flow constricting relation whereby the flow of fluid past said plate produces a displacing movement thereof which is a function of the rate of flow, solenoid means surrounding said conduit and including said plate in the magnetic circuit thereof for applying a magnetic force acting thereon due to the flow of fluid, circuit means for sensing the displacement of said plate, said circuit means including a first bridge network having said solenoid means included in one arm thereof, circuit means connected to said solenoid means for automatically maintaining sufficient current flow through said solenoid means to retain said plate in the zero flow position thereof, said circuit means comprising said first bridge network, a second bridge network having one set of terminals thereof coupled across a source of electric energy and the remaining set of terminals coupled across said first bridge network to energize the same, and an error signal detector circuit having an input coupled to said first bridge network and its output operatively coupled to said second bridge network, and indicator means coupled in circuit relationship with said circuit means for deriving an indication of the current supplied to said solenoid means, said indicator means including instrument means for integrating the fluid flow rate over desired periods of time to thereby obtain an indication of the volume of flow.

2. A meter for measuring flow of fluids through a section of conduit constructed of a non-magnetic material, said meter including a movably supported element of magnetizable means positioned in said section of conduit and adapted to be displaced in a manner which is a function of the flow of fluid through said conduit, circuit means for sensing the displacement of said magnetizable material including a solenoid coil means surrounding said conduit and encompassing said magnetizable means within its magnetic circuit, bridge circuit means including said coil means for producing an output signal which is a function of the displacement of said magnetizable means, control means responsive to said output signal for rebalancing said bridge circuit and controlling the current in said solenoid means to apply a counter-acting magnetic force to said magnetizable material to displace it in a direction opposite to that produced by the flow of fluid, and indicator means connected to said control means for deriving an indication of said counter-acting force whereby a measure of the fluid flow is obtained.

3. A meter for measuring the flow of fluids through a section of conduit constructed of a non-magnetic material, said meter including resilient means having a movable portion displaceable in a manner which is a function of the flow of fluid through said conduit, said means being supported within said section of conduit, a magnetizable plate element secured to the movable portion of said first mentioned means and displaceable therewith, circuit means for sensing the displacement of said magnetizable plate including a solenoid coil means surrounding said conduit and encompassing said magnetizable plate within its magnetic circuit, bridge circuit means including said coil means for producing an output signal which is a function of the displacement of said magnetizable means, means responsive to said output signal for producing an error signal, current control means coupled between said control signal producing means and said bridge circuit means controlling the current supplied to said solenoid means to apply a magnetic force to said magnetizable plate to cause it to be displaced in a direction opposite to that produced by the fluid flow, and indicator means coupled in circuit relationship with said current control means for deriving an indication of the current supplied to said solenoid circuit means, said indicator means including instrument means for integrating the fluid flow rate over desired periods of time to thereby obtain an indication of the volume of flow.

4. A meter for measuring the flow of highly corrosive electrically non-conductive fluids through a section of conduit constructed of a non-magnetic material, said meter including a flexible bellows having one of the ends thereof secured to the inner surface of said section of conduit, a magnetizable plate having an orifice therein secured to the remaining free end of said bellows, said bellows and said orifice plate being disposed in said conduit in flow constricting relation whereby the flow of fluid past said plate produces a displacing movement thereof which is a function of the rate of flow, circuit means for sensing the displacement of said magnetizable plate including a solenoid coil surrounding said conduit and encompassing said magnetizable means within its magnetic circuit, bridge circuit means including said coil means for producing an output signal which is a function of the displacement of said magnetizable plate, detector means responsive to said output signal for producing a control signal, variable current control means coupled between said control signal producing means and said bridge circuit means and responsive to control signal for controlling the current supplied to said solenoid means for applying a stabilizing magnetic force to said magnetizable plate to cause it to be displaced in a direction opposite to that produced by the fluid flow, and indicator means coupled in circuit relationship with said variable current control means for deriving an indication of the current supplied to said solenoid means, said indicator means including instrument means for integrating the fluid flow rate over desired periods of time to obtain an indication of the volume of flow.

5. A meter for measuring the flow of highly corrosive electrically non-conductive fluid through a section of conduit constructed of a non-magnetic material, said meter including a capillary tube, resilient means supporting said capillary tube within said conduit with the axis thereof substantially aligned with the axis of the conduit whereby the flow of fluid through said capillary tube produces a displacing movement thereof which is proportional to the rate of flow, a magnetizable element secured to one end of said capillary tube for movement therewith, circuit means for sensing the displacement of said magnetizable element including solenoid coil means surrounding said conduit and encompassing said magnetizable element within its magnetic circuit, bridge circuit means including said coil means for producing an output signal which is a function of the displacement of said magnetizable element, means responsive to said output signal for producing a control signal, control means coupled between said control signal producing means and said bridge circuit for rebalancing said bridge circuit means and applying a counter-acting magnetic force to said magnetizable element to displace it in a direction opposite to that produced by the flow of fluid, and indicator means connected to said control means for deriving an indication of said counteracting magnetic force whereby a measure of the fluid flow is obtained.

6. A meter for measuring the flow of highly corrosive electrically non-conductive fluids through a section of conduit constructed of a non-magnetic material, said meter including a capillary tube, resilient means supporting said capillary tube within said conduit with the axis thereof substantially aligned with the axis of conduit whereby the flow of fluid through said capillary tube produces a displacing movement thereof which is proportional to the rate of flow, a magnetizable element secured to one end of said capillary tube for movement therewith, solenoid means surrounding said conduit for producing a magnetic field that passes through said magnetizable plate, means operatively connected to said solenoid means for developing a force to counteract the effect of displacement of said magnetizable plate relative to said solenoid means, said last-mentioned means comprising a bridge network having said solenoid means included therein as two adjacent arms and energized by a source of electric energy, the remaining arms of said bridge network having a movable core therein for rebalancing said network after a displacement of said magnetizable plate, and transducer means electrically coupled to said bridge network and mechanically connected to said movable core for causing the same to counteract the effect of displacement of said magnetizable plate on said bridge network, and indicator means operatively connected to said movable core for deriving an indication of the counteracting force developed by said transducer means whereby a measure of the flow of fluid through said conduit is obtained.

7. A meter for measuring the flow of highly corrosive electrically non-conductive fluid through a section of conduit constructed of a non-magnetic material, said meter including a capillary tube, a pair of opposed flexible bellows secured in said conduit and resiliently supporting said capillary tube within said conduit with the axis thereof substantially aligned with the axis of conduit in flow constricting relation whereby the flow of fluid through said capillary tube produces a displacing movement thereof which is proportional to the rate of flow, a magnetizable element secured to one end of said capillary tube for movement therewith, solenoid means surrounding said conduit for producing a magnetic field that passes through said magnetizable plate, means operatively connected to said solenoid means for developing a force to counteract the effect of displacement of said magnetizable plate relative to said solenoid means, said last-mentioned means comprising a bridge network having said solenoid means included therein as two adjacent arms and energized by a source of electric energy, the remaining arms of said bridge network having a movable core therein for rebalancing said network after a displacement of said magnetizable plate, and transducer means electrically coupled to said bridge network and mechanically connected to said movable core for causing the same to counteract the effect of displacement of said magnetizable plate on said bridge network, and indicator means operatively connected to said movable core for deriving an indication of the counteracting force developed by said transducer means whereby a measure of the flow of fluid through said conduit is obtained.

References Cited in the file of this patent

UNITED STATES PATENTS

| | | |
|---|---|---|
| 1,699,163 | Schiske | Jan. 15, 1929 |
| 1,967,017 | Bohner | July 17, 1934 |
| 2,032,245 | Wotring | Feb. 25, 1936 |
| 2,383,757 | Ziebolz | Aug. 28, 1945 |
| 2,422,762 | Williams | June 24, 1947 |
| 2,487,083 | Warshaw | Nov. 8, 1949 |
| 2,571,863 | Godsey | Oct. 16, 1951 |
| 2,688,253 | Markson | Sept. 7, 1954 |

FOREIGN PATENTS

| | | |
|---|---|---|
| 662,353 | Great Britain | Dec. 5, 1951 |